United States Patent
Rule et al.

(10) Patent No.: US 12,229,778 B2
(45) Date of Patent: Feb. 18, 2025

(54) SYSTEMS AND METHODS FOR BUILDING BLOCKCHAINS FOR VERIFYING ASSETS FOR SMART CONTRACTS

(71) Applicant: Capital One Services, LLC, McLean, VA (US)

(72) Inventors: Jeffrey Rule, Chevy Chase, MD (US); Abdelkader Benkreira, Washington, DC (US); Rajko Ilincic, Annandale, VA (US); William Carroll, Huntingtown, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 539 days.

(21) Appl. No.: 16/901,718

(22) Filed: Jun. 15, 2020

(65) Prior Publication Data
US 2021/0390549 A1   Dec. 16, 2021

(51) Int. Cl.
G06Q 20/40   (2012.01)
H04L 9/00   (2022.01)
H04L 9/06   (2006.01)

(52) U.S. Cl.
CPC ....... *G06Q 20/4016* (2013.01); *G06Q 20/403* (2013.01); *H04L 9/0637* (2013.01); *G06Q 2220/00* (2013.01); *H04L 9/50* (2022.05)

(58) Field of Classification Search
CPC ............. G06Q 20/4016; G06Q 20/403; G06Q 2220/00; H04L 9/0637; H04L 9/50; H04L 67/1057; H04L 2463/102; H04L 63/12
See application file for complete search history.

(56) References Cited

U.S. PATENT DOCUMENTS 5,712,913 A    1/1998  Chaum
6,389,536 B1   5/2002  Nakatsuyama
(Continued)

FOREIGN PATENT DOCUMENTS

CN    109 194 482 A       1/2019
CN    110473058 A    *   11/2019
(Continued)

OTHER PUBLICATIONS

Wenbo Wang, A survey on Consensus Mechanisms and Mining Strategy Management in Blockchain Networks, Mar. 2019, IEEE (Year: 2019).*
(Continued)

*Primary Examiner* — Neha Patel
*Assistant Examiner* — Chunling Ding
(74) *Attorney, Agent, or Firm* — HUNTON ANDREWS KURTH LLP

(57) ABSTRACT

Systems and methods build blockchains and verify assets for smart contracts. A system includes a memory, a blockchain, a set of nodes, a set of verifiers, a set of miners, and a consensus protocol. The memory can have a block data structure representing a transaction for an asset having an identifier and at least one verifiable characteristic. The consensus protocol can include rules for: receiving the stake at risk from the verifiers, providing the reputational score to the verifiers, verifying the verifiable characteristic of the asset by the verifiers, cryptographic verification by the miners, adding the new block to the blockchain by the miners, providing the reward to the miners, and distributing the copy of the blockchain to each node.

15 Claims, 7 Drawing Sheets

(56) References Cited

U.S. PATENT DOCUMENTS

| | | |
|---|---|---|
| 7,085,926 B1 | 8/2006 | Peach |
| 8,122,252 B2 | 2/2012 | Karamchedu et al. |
| 10,855,475 B1* | 12/2020 | Leach .................. H04L 9/0637 |
| 2004/0177092 A1 | 9/2004 | Salle |
| 2006/0195700 A1 | 8/2006 | Nankani et al. |
| 2006/0282393 A1 | 12/2006 | Sladek et al. |
| 2007/0067246 A1 | 3/2007 | Wang |
| 2008/0022109 A1 | 1/2008 | Miyazaki et al. |
| 2008/0052519 A1 | 2/2008 | Lee et al. |
| 2008/0162355 A1 | 7/2008 | Lee et al. |
| 2011/0015957 A1 | 1/2011 | Allen et al. |
| 2012/0317034 A1 | 12/2012 | Guha et al. |
| 2013/0054471 A1 | 2/2013 | Samid |
| 2014/0122160 A1 | 5/2014 | Fuller et al. |
| 2014/0250537 A1 | 9/2014 | Siris |
| 2015/0371228 A1 | 12/2015 | Kershaw et al. |
| 2015/0379511 A1 | 12/2015 | Hartling |
| 2016/0342977 A1 | 11/2016 | Lam |
| 2017/0140394 A1 | 5/2017 | Cao et al. |
| 2017/0243193 A1 | 8/2017 | Manian et al. |
| 2017/0270284 A1 | 9/2017 | Sreesha et al. |
| 2017/0344988 A1 | 11/2017 | Cusden et al. |
| 2017/0372277 A1 | 12/2017 | Worthington |
| 2018/0082256 A1 | 3/2018 | Tummuru et al. |
| 2018/0089638 A1 | 3/2018 | Christidis et al. |
| 2019/0237169 A1* | 8/2019 | Culver .................. G06F 9/547 |
| 2019/0303622 A1* | 10/2019 | Versteeg .................. H04L 9/50 |
| 2019/0372776 A1* | 12/2019 | Kroneisen ............. H04L 9/3239 |
| 2020/0019923 A1* | 1/2020 | Santhar ................ G06Q 10/087 |
| 2020/0084046 A1* | 3/2020 | Bessonov ............... H04L 9/321 |
| 2020/0119926 A1* | 4/2020 | Buki .................... G06Q 20/401 |
| 2020/0162261 A1* | 5/2020 | Iyer ...................... H04L 9/3239 |
| 2020/0175622 A1* | 6/2020 | Lin ...................... G06Q 50/163 |
| 2020/0220723 A1* | 7/2020 | Rastit .................... H04L 9/3239 |
| 2021/0012433 A1* | 1/2021 | Zhu ...................... H04L 9/0637 |
| 2021/0158443 A1* | 5/2021 | Kilgore .............. G06Q 20/3678 |
| 2021/0243037 A1* | 8/2021 | Wang .................... H04L 9/3263 |
| 2022/0172284 A1* | 6/2022 | Tarmann ............... G06F 16/337 |
| 2022/0351288 A1* | 11/2022 | Britz ................. G06Q 20/3672 |

FOREIGN PATENT DOCUMENTS

| | | |
|---|---|---|
| CN | 111 241 114 A | 6/2020 |
| WO | WO-2011134053 A1 * 11/2011 | ......... G06F 16/2365 |
| WO | 2019/126385 A1 | 6/2019 |
| WO | WO-2020248054 A1 * 12/2020 | ......... G06F 16/9024 |
| WO | WO-2021108978 A1 * 6/2021 | |

OTHER PUBLICATIONS

Andreas M. Antonopoulos, Chapter 7 of Mastering Bitcoin, Jul. 2017, O'Reily Media (Year: 2017).*

Quan Nguyen, Stakedag: Stake-Based Consensus for Scalable Trustless Systems, Jul. 2019, https://arxiv.org/pdf/1907.03655 (Year: 2019).*

International Search Report and the Written Opinion of the International Searching Authority issued in related PCT Application No. PCT/US2021/037212, mailed Sep. 24, 2021.

Notification Concerning Transmittal of International Preliminary Report on Patentability from related PCT Application No. PCT/US2021/037212, mailed Dec. 29, 2022.

* cited by examiner

SYSTEMS AND METHODS FOR BUILDING BLOCKCHAINS FOR VERIFYING ASSETS FOR SMART CONTRACTS

FIELD OF THE DISCLOSURE

The present disclosure generally relates to networks, data structures, distributed ledger technologies, blockchain, and smart contracts and, in particular, to systems and methods for building blockchains for verifying assets for smart contracts.

BACKGROUND

Blockchain technology is a ledger that is distributed to members of a computer network. The ledger records accounting and other information about electronic transactions. When the blockchain is public, anyone can read it. The blockchain is immutable, meaning that no one can change the record of what happened in the past. Blockchain technology includes a consensus process to ensure that all the copies of the ledger on the network are the same. Conventional implementations of the consensus process may be expensive and wasteful in terms of computing resources such as power, time, and storage. In addition, conventional implementations may not achieve speeds or accessibility to be widely adopted.

Blockchain technology is not widely trusted for electronic transactions. Blockchain relies on trust in members of a computer network, who may be unknown. When people know each other in a community, trustworthy behavior is promoted by reputations. The lack of reputation information undermines trust. Blockchain transactions sometimes remove middlemen such as financial institutions. Regulators of financial institutions can promote trustworthy behavior through the threat of imposing sanctions or legal action. Without this threat, there is a greater risk of theft and fraud.

Blockchain technology relies on trusting the security of cryptography, protocols, software, and computer networks. Failures in computer and internet security systems erodes trust.

Blockchain technology does not provide a way to represent details about real world items and verify the authenticity of real world items that may be the subject of transactions or smart contracts. The inability to determine whether an item is real or fake erodes trust.

Accordingly, there are significant, and competing, needs in the fields of networks, data structures, distributed ledger technologies, blockchain, and smart contracts. There is a need for less expensive and less wasteful consensus processes. There is a need for generally promoting trustworthy behavior and preventing theft, fraud, and counterfeiting.

SUMMARY

The disclosed subject matter is directed to systems and methods for building blockchains for verifying assets for smart contracts that satisfy these needs.

An example embodiment of the present disclosure can be a system including a memory, a blockchain, a set of nodes, a set of verifiers, a set of miners, and a consensus protocol. The memory can have a block data structure representing a transaction for an asset having an identifier and at least one verifiable characteristic. The blockchain can be in the memory and link one or more blocks having the block data structure. The set of nodes can be in data communication in a peer-to-peer network. Each node can be capable of receiving a distributed copy of the blockchain. At least one of the nodes can include the memory. The set of verifiers can be members of the set of nodes. Each verifier can hold a stake at risk. Each verifier can receive a reputational score. Each verifier has a private key. Each verifier is capable of verifying the verifiable characteristic of the asset and signing a new block with the private key. The set of miners can be members of the set of nodes. Each miner is capable of cryptographically verifying the new block using a public key in return for a reward and adding the new block to the blockchain. The consensus protocol can be in memory and include rules for: receiving the stake at risk from the verifiers, providing the reputational score to the verifiers, verifying the verifiable characteristic of the asset by the verifiers, cryptographic verification by the miners, adding the new block to the blockchain by the miners, providing the reward to the miners, and distributing the copy of the blockchain to each node. The system can further include a smart contract for the asset in the blockchain, where the blockchain includes the new block that verifies the at least one verifiable characteristic of the asset. The smart contract can be for the digital sale of the asset. The stake at risk can be in cryptocurrency. The reward can be in cryptocurrency. The verifiers can pay a verification fee. The verifiers can receive a verification reward. The stake at risk can vary for different verifiers and the verification reward can vary depending on the stake at risk by the verifier. The consensus protocol can further include rules for refreshing the at least one verifiable characteristic of the asset after an event. The consensus protocol can further include rules for refreshing the at least one verifiable characteristic of the asset after a period of time. The system can further include a smart contract for receiving the stake at risk from the verifiers and providing the reward to the miners. The system can further include a secure key issuer for issuing the public keys and the private keys.

An example embodiment of the present disclosure can be a method. A private key and a public key can be issued to each of a set of nodes in a network. A stake at risk from a node that is a verifier can be received. A node that is a miner can distribute a blockchain to the network. The blockchain can have a new block representing a transaction for an asset having an identifier and a verifiable characteristic. The verifiable characteristic can be verified and signed with the private key by the verifier and the new block can be cryptographically verified by the miner using the public key. A reward can be provided to the miner. A reputational score can be provided to the verifier. A verification fee can be received from the verifier. A verification reward can be provided to the verifier. A smart contract can be provided for sale of the asset. The asset can be provided for sale. Upon an event, verification of the asset can be requested. Upon expiration of a time period, verification of the asset can be requested.

An example embodiment of the present disclosure can be a non-transitory computer-accessible medium having stored thereon computer-executable instructions for building blockchains for verifying assets for smart contracts, wherein upon execution by a computer arrangement comprising a processor, the instructions cause the computer arrangement to perform procedures. A block interface can be provided that provides a block data structure representing a transaction for an asset having an identifier and at least one verifiable characteristic. A host interface can be provided that can be configured to host a set of nodes in data communication in a peer-to-peer network. A key issuer interface can be provided that can be configured to issue private and public keys to each of the nodes. An ante up interface can be provided that can be configured to receive a stake at risk in cryptocurrency from one of the nodes. A reputational score interface can be provided that can be configured to assign a reputational score to one of the nodes. A verifier interface can be provided that can be configured to verify the verifiable characteristic of the asset and sign a new block with the private key and receive a verification reward in cryptocurrency. A miner interface can be provided that can be configured to cryptographically verify the new block using a public key in return for a reward in cryptocurrency and add the new block to a blockchain. An update blockchain interface can be provided that can be configured to link one or more blocks having the block data structure into the blockchain. A distribute blockchain interface can be provided that can be configured to distribute the blockchain to each node. A smart contract interface can be provided that can be configured to manage a digital sale of the asset.

These and other features, aspects and advantages of the disclosed subject matter are explained in greater detail with reference to specific example embodiments that are illustrated in the following description, appended claims, and accompanying drawings.

DETAILED DESCRIPTION OF EXAMPLE EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Figure 1:
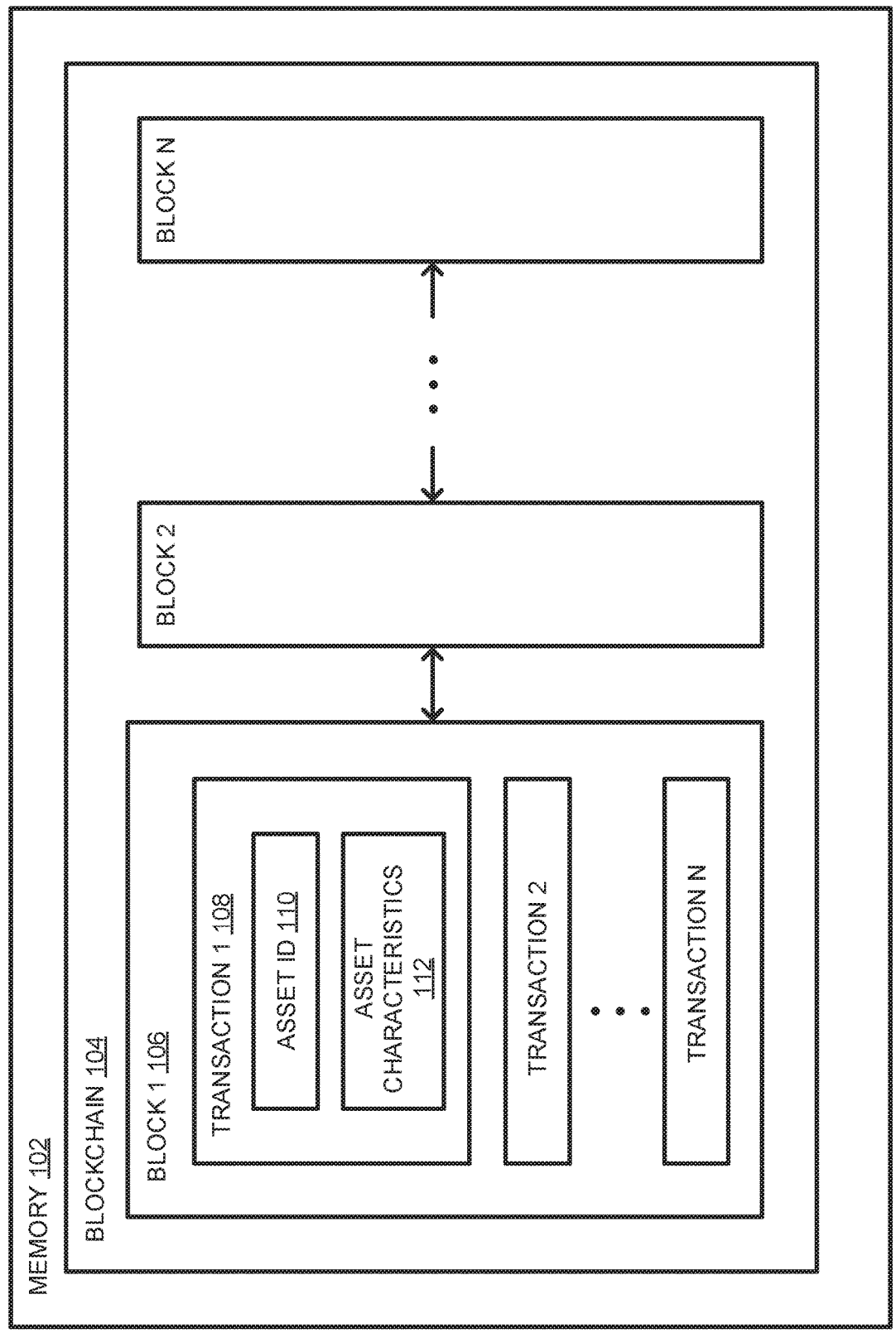
FIG. 1 is a diagram of a system for building blockchains for verifying assets for smart contracts, according to an example embodiment of the disclosure.

FIG. 1 is a diagram of a system 100 according to an example embodiment of the disclosure. System 100 can include a network-enabled computer having a memory 102 that holds a blockchain 104. The memory can have a block 106 data structure representing a transaction 108 for an asset having an identifier 110 and one or more verifiable asset characteristics 112. Blockchain 104 can be in memory 102 and link one or more blocks 106 having the block data structure. As shown in FIG. 1, the block data structure may comprise one or more transactions 108, each of which may include an asset identifier 110, one or more asset characteristics 112, and other data.

Blockchain 104 can manage transactions 108 involving digital or real world assets without the need for an intermediary such as a bank or credit card processor. A digital asset may be any image, multimedia, textual or other content that can be stored electronically and includes the right to use it. A cryptocurrency may be a digit asset that works as a medium of exchange to secure financial transactions, control the creation of additional units and verify the transfer of assets such as Bitcoin® or Ethereum®. A real world asset may be any item of value, such as real estate, real property, or personal property. Assets may include tangible items such as appliances, jewelry, sneakers, art, and cars. Assets may include intangible items such as bank accounts, stocks, bonds, right to a benefit, options, and shares. Blockchain 104 may include tokenized assets. A tokenized asset is any tangible or intangible property such as real or chattel property or a legal interest in an asset that is represented by a token on blockchain 206.

Transaction 108 may reflect the state of the asset associated with blockchain 104, an event associated with the asset, or any other data related to the asset. For example, transaction 108 may be a request for a home mortgage verification from a banker, a description of a designer purse for sale in an auction, or a notice that a car needs an emissions inspection by a certain date. Transaction 108 may be an ownership record such as a stock certificate, an operating agreement for a business, or a recorded lien on real estate. Transaction 108 may be a data store for property, digital content distribution, a stop in a supply chain, votes for a candidate, patient medical records, chain of title deed recording records, or some part of data related to applications of blockchain technology. Transaction 108 may be a payment exchanged for a good and/or service such as the purchased item, price, merchant name, and customer payment information. Transaction 108 may be a placeholder, pre-approval, or evaluation of an asset before a transaction occurs. For example, transaction 108 may be an itemized list of verifications of data associated with the sale of a residential home and an indication of whether everything has been verified or further verifications are needed. For example, transaction 108 may be an entry from a smart contract related to the asset or the processing of the asset on the blockchain according to consensus processes.

Blockchain 104 can be used to manage transactions 108. To do so, blockchain 104 may employ methods to store and access transactions, consensus methods to approve and record transactions, cryptographic methods to authenticate parties to the transactions, methods to store and pay with currency, and methods to enforce a condition or automate a process with smart contracts. Blockchain 104 can be a data structure in a linked list of blocks 106 connected back to one another by hashed links. Each block 106 can contain hashes of transactions 108. Any method may be used for hashing transactions 108, including without limitation the Merkle Tree method. Blockchain 104 can be publicly accessible or private (viewable only to known entities or members of a group or network).

Each block 106 can include a number of transactions 108. Each transaction 108 may be validated before being added to block 106 and blocks 106 may not be altered or deleted from blockchain 104. Each transaction 108 is visible to members of the network because blockchain 104 is distributed to each member of the network.

Each transaction 108 can include an asset identifier 110 and one or more asset characteristics 112. Asset identifier 110 may be any kind of identifier suitable for the asset, such as a serial number, an RFID tag, an inventory tracking number, an identification code, a real estate plot number, or a vehicle identification number. Asset characteristics 112 may be any kind of verifiable characteristic suitable for the asset or transactions involving the asset. Before each block 106 is added to blockchain 104, the asset characteristics 112 can be verified by a verifier suitable to the asset.

For example, if the asset is a residential home, asset characteristics 112 can include the address, date the home was built, square feet, address, liens, additions, mortgage information and the like. For the residential home, verifiers can include realtors, mortgage brokers, home owners, and so on. For example, if the asset is a diamond ring, asset characteristics 112 can include weight, color, clarity, shape, carat, setting, style and the like. For the diamond ring, verifiers can include an expert jeweler, registered jeweler, certified gemologist, certified appraiser, and so on. For example, if the asset is sneakers, asset characteristics 112 can include color, size, brand, style, and the like. For the sneakers, verifiers can include streetwear experts, retail organization investigators, retailers, and so on. For example, if the asset is art, asset characteristics 112 can include artist, date, category, medium, origin, provenance, stylistic period, subject matter or theme, price, and the like. For art, verifiers can include forensic art investigators, conservation scientists, conservators, dealers, museums, auction houses, collectors, art experts, authentication boards, art historians, and so on. If the asset is a handbag, asset characteristics 112 can include brand, condition, description, cost, location, features, fabric, stitching, labels, designer logo, styling, and the like. For handbags, verifiers can include retailers, designers, authenticators, certifiers, brand experts, and so on. If the asset is a used car, asset characteristics 112 can include mileage, drive type, engine, transmission, fuel type, miles per gallon (mpg), exterior, interior, stock number, vehicle identification number (VIN), price, location, repair history, and the like. For cars, verifiers can include inspectors, dealers, repair shops, certified mechanics, and so on.

As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, a mobile device, or other device. For example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

A network-enabled computer can include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein.

A network-enabled computer can include a display and input devices. The display can be any type of device for presenting visual information such as a computer monitor, a flat panel display, and a mobile device screen, including liquid crystal displays, light-emitting diode displays, plasma panels, and cathode ray tube displays. The input devices can include any device for entering information into the user's device that is available and supported by the user's device, such as a touch-screen, keyboard, mouse, cursor-control device, touch-screen, microphone, digital camera, video recorder or camcorder. These devices can be used to enter information and interact with the software and other devices described herein. In some examples, the network-enabled computer can execute one or more applications, such as software applications, that enable, for example, network communications with one or more components of the system and transmit and/or receive data.

A network-enabled computer can be a client device in communication with one or more servers via one or more networks, and can operate as a respective front-end to back-end pair with the server. A client device can transmit, for example from a mobile device application executing on the client device, one or more requests to the server. The one or more requests can be associated with retrieving data from the server. The server can receive the one or more requests from the client device. Based on the one or more requests from the client device, the server can be configured to retrieve the requested data from one or more databases. Based on receipt of the requested data from the one or more databases, the server can be configured to transmit the received data to the client device. For example, the received data can be responsive to one or more requests.

The network can be one or more of a wireless network, a wired network or any combination of wireless network and wired network, and can be configured to connect the client device to the server. For example, the network can include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

The network can include, without limitation, telephone lines, fiber optics, IEEE Ethernet 902.3, a wide area network, a wireless personal area network, a LAN, or a global network such as the Internet. The network can support an Internet network, a wireless communication network, a cellular network, or the like, or any combination thereof. The network can further include one network, or any number of the exemplary types of networks mentioned above, operating as a stand-alone network or in cooperation with each other. The network can utilize one or more protocols of one or more network elements to which they are communicatively coupled. The network can translate to or from other protocols to one or more protocols of network devices. Although the network is depicted as a single network, it should be appreciated that according to one or more examples, the network can comprise any number of interconnected networks, such as, for example, the Internet, a service provider's network, a cable television network, corporate networks, such as credit card association networks, and home networks.

Figure 2:
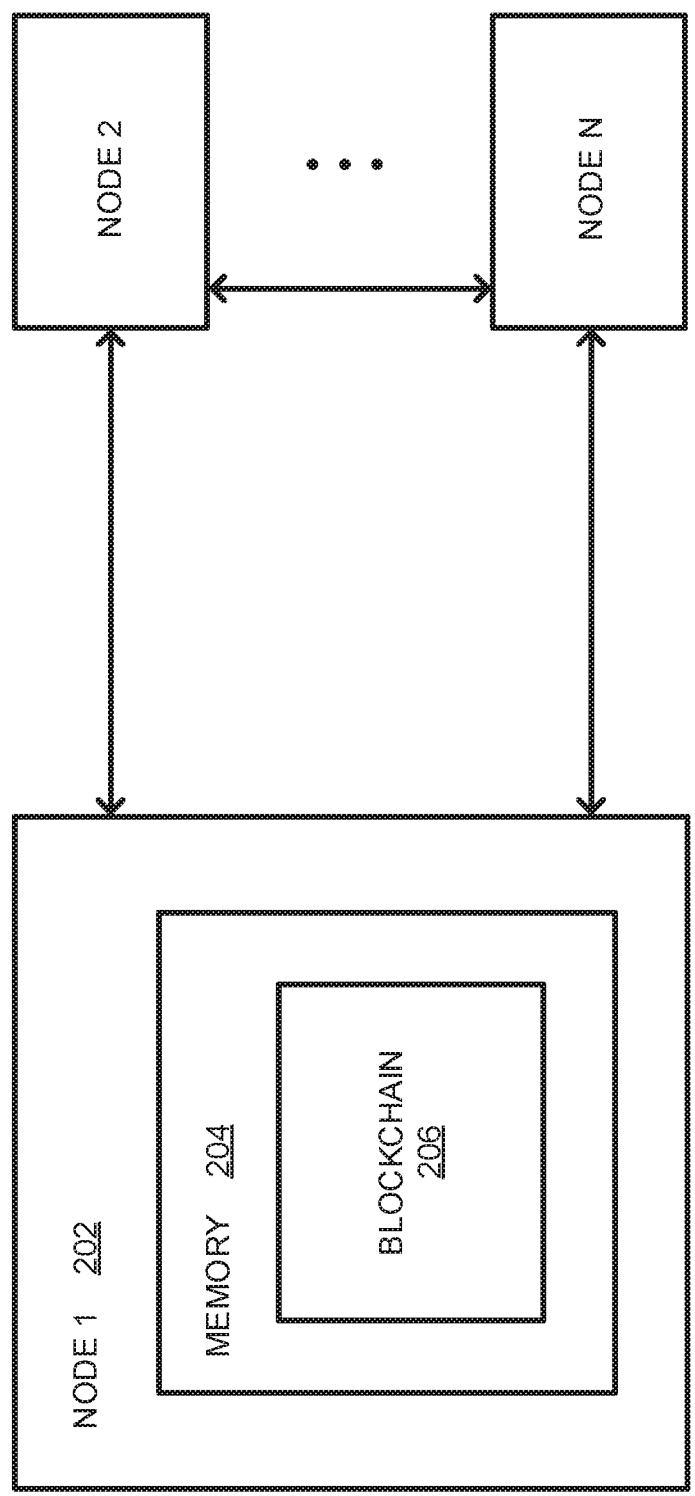
FIG. 2 is a diagram of a system for building blockchains for verifying assets for smart contracts, according to an example embodiment of the disclosure.

FIG. 2 is a diagram of a system 200 for building blockchains 206 for verifying assets for smart contracts, according to an example embodiment of the disclosure. System 200 includes a set of nodes 202, such as node 1, node 2 . . . node n. Nodes 202 can be in data communication in a peer-to-peer network or other kind of network. The peer-to-peer network may be any number of network-enabled computers or nodes that are connected and share resources without a central server computer so that each computer may act as both a client and server. Each node 202 is capable of receiving a distributed copy of blockchain 206 and storing it in memory 204. Nodes 202 may be anonymous or identify participants.

System 200 may be part of a blockchain technology stack having layers or components such as shared data, protocols, platforms, products, applications, and smart contracts. Shared data may be the decentralized database or distributed ledger technology that stores all the transactions in hashed format. Protocols may include TCP/IP, SMTP, HTTP, HTTPS, Bitcoin, Ethereum, ERC-20, and others. Protocols may implement rules for consensus, validation, incentives, and participation in system 200. Platforms may be any kind of middleware that allows developers to build applications on top of the protocol layer such as Ethereum, NEO, and EOS. Products may provide an interface to protocols and platforms and allow users to interact with shared data. Developers may use platforms to build products such as decentralized applications and smart contracts. Smart contracts may be capable of self-executing conditions and terms of an agreement between parties including writing the resulting transactions into the blockchain. Applications may include trade finance, payments, mortgages, letters of credit, asset registration, citizen identity, medical records, medicine supply chain, retail supply chain, loyalty programs, insurance claims processing, risk provenance, asset usage history, claims files, manufacturing supply chain, product parts, maintenance tracking, and others.

A consensus process may be used to update, maintain and distribute blockchain 206 to nodes 202. Because peer-to-peer networks have no central server or administrator, the members of the network, nodes 202, need to reach consensus on the state of the distributed ledger, blockchain 206. The state of blockchain 206 includes validation of the uniqueness and order of accounting records. Nodes 202 can reach consensus on the state of blockchain 206 through consensus methods. Some consensus methods are: Proof of Work, Proof of Stake, Proof of Burn, Proof of Activity, Proof of Elapsed Time, and Simplified Byzantine Fault Tolerance.

Blockchain 206 can include ledgers, transactions, and contracts. Ledgers can log transactions and describe the inputs and outputs of a business. Transactions can be an asset transfer between nodes 202. Contracts can describe the conditions for a transaction to occur. Blockchain 206 can provide cryptographic proof that transactions occurred. Blockchain 206 can involve assets and/or cryptocurrency. The nodes 202 in system 200 share a replicated blockchain 206.

System 200 can be part of networks such as customers, suppliers, banks, businesses, regulators, industry groups, and other organizations and members. System 200 can include the flow of goods and services in transactions and contracts across networks in various regions and countries and include public and private markets. System 200 can add or remove nodes 202 and some nodes 202 can be verifiers (FIG. 3) and/or miners (FIG. 4) according to consensus processes and protocols for blockchain 206.

Figure 3:
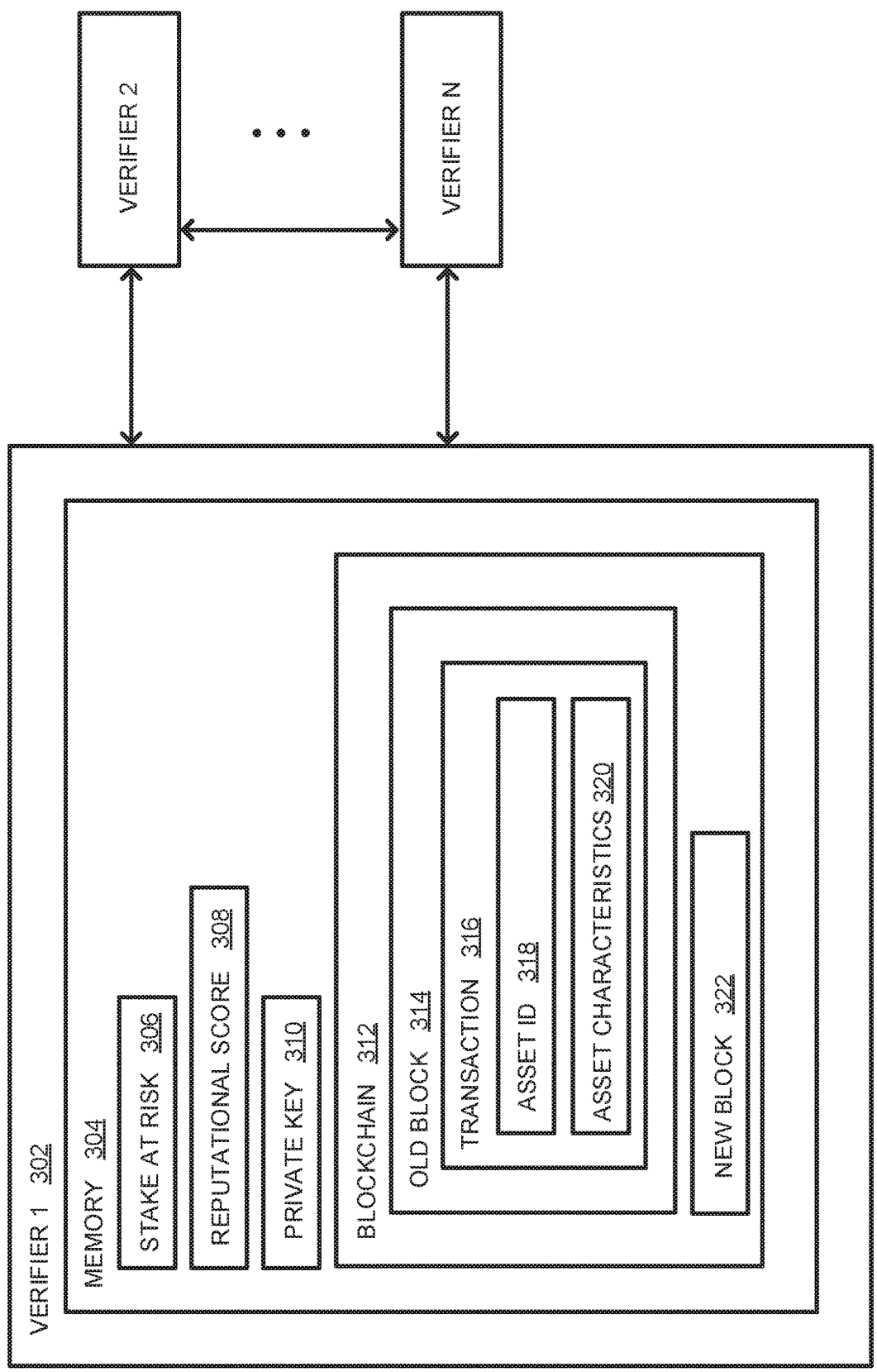
FIG. 3 is a diagram of a system for building blockchains for verifying assets for smart contracts, according to an example embodiment of the disclosure.

FIG. 3 is a diagram of a system 300 for building blockchains 312 for verifying assets for smart contracts, according to an example embodiment of the disclosure. System 300 includes a set of one or more verifiers 302, such as verifier 1, verifier 2 . . . verifier n, which are computers connected in a network. Verifiers 302 can be members of the set of nodes in FIG. 2. Each verifier 302 with the set of one or more verifiers can hold a stake at risk 306 in memory 304. Each verifier 302 can receive a reputational score 308. Each verifier 302 has a private key 310. Each verifier 302 is capable of verifying the verifiable characteristic 320 of the asset in a transaction 316 in an old block 314 and signing a new block 322 with the private key 310 for the blockchain 312. For example, old block 314 may be information about the original owner of a used car and transaction 316 may include the title to the car, asset ID 318 may be the VIN number, and asset characteristics 320 may include information about maintenance records and car loans. Verifiers 302 may include the original owner of the used car, an agent at a car dealership, an auto repair shop mechanic, an official from the department of motor vehicles, and a loan officer at a bank.

One or more verifiers 302 can verify one or more asset characteristics 320 in transaction 316. For example, if the asset is a residential home, a realtor can verify the square footage and address. For example, if the asset is a diamond ring, an appraiser can verify the color, clarity, and carat. For example, if the asset is sneakers, a retailer can verify the brand, style, and size. For example, if the asset is art, a conservator can verify the artist and provenance. As another example, if the asset is a handbag, a brand expert can verify the brand and designer logo. As another example, the asset is a used car, a certified mechanic can verify the mileage and condition.

Once asset characteristics 320 is verified, verifier 302 can encrypt and add new block 322 to blockchain 312. Verifier 302 can sign new block 322 with their private key 310. In this way, verifier 302 can attest to the authenticity of asset characteristics 320. Other members of the network can use a public key to verify the identity of the signer on new block 322. Public key or asymmetric cryptography can be used to secure the identity of the sender of transactions 316 and to prevent tampering with past records in blockchain 314. Public key cryptography uses a combination of a sender's private key and a recipient's public key to encrypt a message. Public key cryptography uses a recipient's private key and sender's public key to decrypt the message. Public key cryptography can also produce a digital signature as a combination of a user's identity and the data in the message. Any kind of hash function can be used to represent the current state of blockchain 312. New block 322 includes a new hash of the current state and includes the previous state of old block 314 so that changing any previous record would require all the hashes to be changed. This would be noticeable to other members of the network and not pass the consensus process for adding new block 322 to blockchain 312. Blockchain 312 may be a linked list of blocks 314, 322 connected back to one another by hashed links.

Each verifier 302 can hold a stake at risk 306 in memory 304. Proof of stake may be a kind of consensus process where a member of the network can mine or approve transaction 316 based on the stake they hold. A stake may be an amount of cryptocurrency or anything of value held by a member of the network in a wallet or put up as collateral. For example, a member of the network who holds 3% of the total amount held by all the members of the network can mine or approve 3% of transactions 316. Mining and approving may be a process of validating and recording transactions 316 on blockchain 312 using consensus processes and network protocols.

Blockchain 312 can be a distributed ledger that records transactions 316 across a nodes in a network of system 300, where the nodes include some nodes that are verifiers 302 or miners. The nodes agree on the distributed ledger's contents using consensus processes. The proof of stake (PoS) concept is a more efficient alternative to the more wasteful proof of work (PoW) concept, which sometimes used in consensus processes. PoS offers nodes a monetary reward to update the blockchain 312 without imposing a cost upon nodes to gain the authority to update the blockchain. Blockchain 312 may possess a native token or coin that facilitates exchange on blockchain 312. A stake-holder of blockchain 312 can be a node holding some coins of blockchain 312 in, for example, a digital wallet stored on the node. Under PoS, consensus processes grant authority to update blockchain 312 to stake-holders and may impose a cost upon stakeholders that update blockchain 312 in a manner that creates persistent disagreement. Generally, PoS can reach consensus for updating blockchain 312 in an efficient manner. The consensus processes may restrict access to updating blockchain 312 to sufficiently large stake-holders to induce an equilibrium quickly, because the cost of updating blockchain 312 in a manner with persistent disagreement increases with the stake at risk. For sufficiently large stake-holders, the cost of persistent disagreement outweighs the benefit from the monetary reward for updating blockchain 312.

Consensus processes or protocols can be designed so that disagreement resolves eventually within any equilibrium, because indefinite disagreement nullifies the exchange value of the coins and thus renders those coins worthless. A stake-holder eventually recognizes that their stake value will erode to zero, so they ensure act in a way to reach consensus. There are various PoS mechanisms that can be used such as a Byzantine Fault Tolerant (BFT) PoS mechanism, a chain-based PoS mechanism like Ethereum, and so on. PoS can randomly select stake-holders to append new block 322 to blockchain 312, according to consensus processes or protocols. The stake-holder can receive the option to append new block 322 to blockchain 312, exercise that option, and collect a reward, according to consensus processes or protocols. If there is more than one branch of blockchain 312 competing for legitimacy, a consensus will be reached under the processes or protocol when an equilibrium is achieved and one branch wins under, for example, a longest chain rule where a stake-holder can append only to the longest branch whenever feasible. As blockchain 312 achieves consensus at the earliest possible time when stake-holders follow the longest chain rule, coin prices achieve a maximum in this case. Having a stake at risk and potential costs impel stake-holders to behave well and achieve consensus. Having an eligibility threshold for stake also encourages well-ordered behavior by stake-holders. A stake-holder with negligible stake may delay consensus by seeking block rewards. A stake-holder with a large stake may undermine their own wealth when postponing consensus even if such behavior yields block rewards. The stake-holders can be restricted to those with an ability to append new block 322 to blockchain 312 in line with the reward schedule. As the reward schedule becomes more modest, the restriction can become more lax.

Each verifier 302 can receive a reputational score 308, which may reflect the trustworthiness of the verifier. All the members of the network can contribute to the reputational scores 308 of the other members of the network. For example, if verifier 302 verifies many asset characteristics 320 over time, then verifier 302 will tend to gain a good reputation. On the other hand, if verifier 302 makes mistakes or does questionable verifications of asset characteristics 320 over time, then verifier 302 may gain a bad reputation. Reputational scores 308 can be any indication of reputation such as one to five stars, a score on a numerical scale, a qualitative description (e.g., poor, fair, average, above average, superior), or any other way to compare reputations among members of the network.

Verifiers 302 can include regulators, governmental agencies, centralized authorities, corporations, small businesses, nongovernmental organizations, nonprofits, accountants, business people, banks, financial institutions, individuals, decentralized organizations, decentralized autonomous organizations, law enforcement, internet service providers, social media platform operators, search engines, and other participants in system 300. It is understood that the verifiers 302 are not limited to a particular entity or type of entity.

Figure 4:
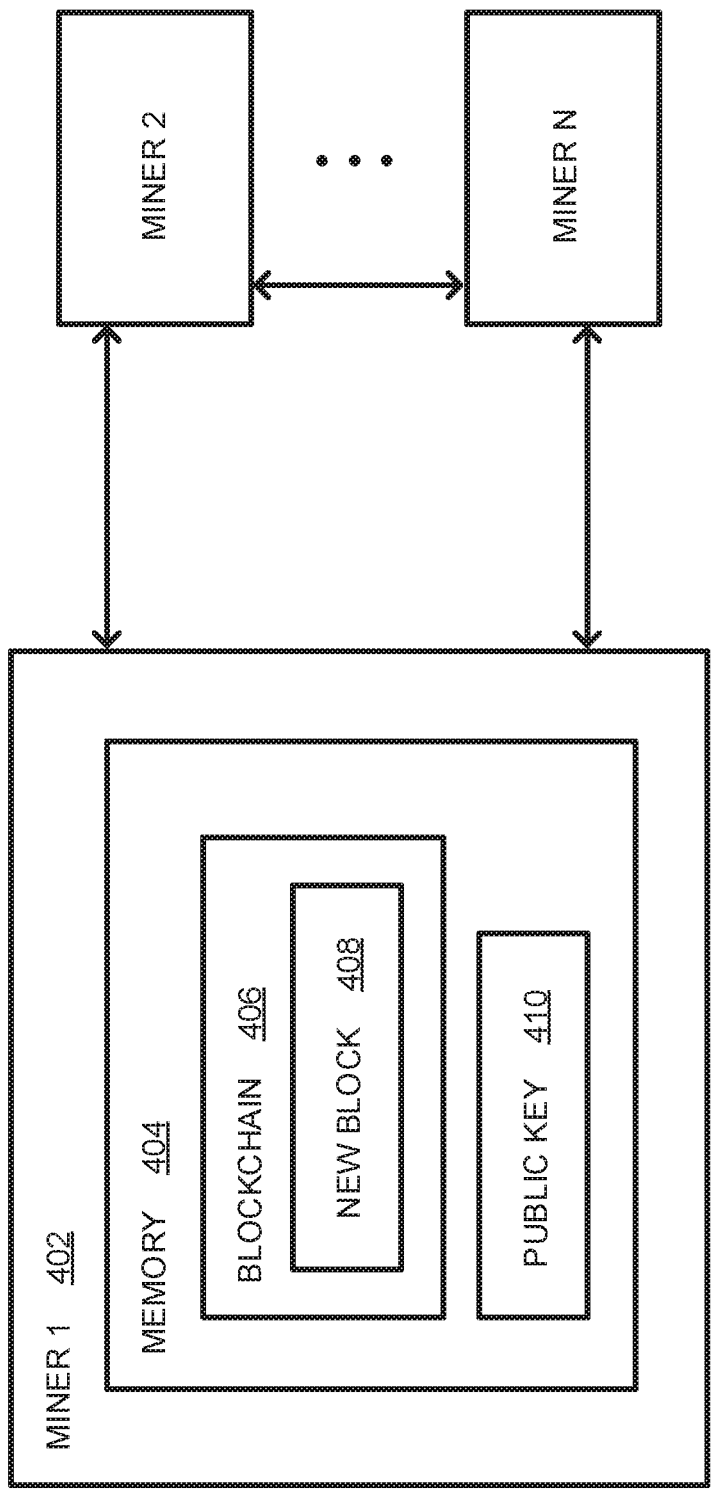
FIG. 4 is a diagram of a system for building blockchains for verifying assets for smart contracts, according to an example embodiment of the disclosure.

FIG. 4 is a diagram of a system 400 for building blockchains 406 for verifying assets for smart contracts, according to an example embodiment of the disclosure. System 400 includes a set of one or more miners 402, such as miner 1, miner 2 . . . miner n, each of which are computers connected in a network. Miners 402 can be members of the set of nodes (FIG. 2). Each miner 402 is capable of cryptographically verifying the new block 408 using a public key 410 in return for a reward and adding new block 408 to the blockchain 406 in memory 404.

Miners 402 provide a service called mining that includes verifying and adding new blocks 408 to blockchain 406 in a decentralized fashion using consensus processes and network protocols. Before becoming a new block 408, pending blocks can be stored in memory 404 and added to blockchain 406, once they are verified by miner 402. Miners 402 may validate new block 408 by, for example checking digital signatures and verifying information in new block 408 such as characteristics of assets. Mining can be rewarded with something of value such as cryptocurrency and miner 402 can store the reward in a digital wallet in memory 404. The reward can be delivered by one node to the digital wallet of its own or another node, according to consensus processes and protocols and may involve a smart contract that automatically delivers a reward upon the fulfillment of certain conditions, such as reaching consensus on appending new block 322 to blockchain 312.

System 400 may be a digital peer-to-peer ledger system designed to securely record transactions in and/or ownership of assets like a decentralized chain of title system. The assets may be, for example, cash or cash equivalents, financial instruments, inventory, cryptoassets, tangible property, intangible property or other assets. System 400 can avoid a double spend problem for assets by ensuring that the seller does not retain a copy of the asset or sell a counterfeit. Blockchain 406 can contain an unbroken audit trail for every transaction that has taken place on system 400. Blockchain 406 can be public or private.

Miners 402 can maintain blockchain 406. Each miner 402 or other participant in system 400 can maintain its own separate and complete copy of the entire blockchain 406 so that it is a distributed ledger. Miners 402 can validate new block 408 and update blockchain 406 to record new block 408. The mining process creates trust and transparency within system 400. Pending blocks on system 400 can be aggregated in memory 404. Once validated by miner 402, a pending block can be encrypted and added to blockchain 406 as new block 408. A hash value can be assigned to new block 408 and reference the preceding block in blockchain 406. If a block in blockchain 406 is altered, the hash number changes, which protects against fraud and enhances transparency. A copy of blockchain 406 is stored on each participant in system 400 and periodically synchronized so that each participant has the same blockchain 406 in memory 404. To ensure that only legitimate new blocks 408 are recorded into blockchain 406, miners 402 confirm that new block 408 is valid and do not invalidate former blocks. New block 408 is appended to the end of blockchain 406 only after system 400 reaches consensus as to the validity of new block 408. Consensus may be achieved through various different mechanisms such as proof of work or proof of stake. After new block 408 is added to blockchain 406, it can no longer be deleted and new block can be accessed and verified by everyone in system 400. New block becomes a permanent record that system 400 can use to coordinate an action or verify an event. Blockchain 406 can be used to create a digital currency, a smart contract, communications and file sharing systems, decentralized domain name management systems, fraud-resistant digital voting platforms, internet-of-things communications, global payments, and other applications.

Each miner 402 can have public key 410 that is shared and private key that is secret. Miners 402 can share public key 410 in order to participate in system 400. The private key can be used by miner 402 to access a virtual wallet, which can contain the digital assets held by miner 402 in system 400. Miners 402 can act on their own behalf or on behalf of owners of the digital assets of system 400. Any type of asset, tangible or intangible can be digitized and represented on blockchain 406.

Miners 402 can include regulators, governmental agencies, centralized authorities, corporations, small businesses, nongovernmental organizations, nonprofits, accountants, business people, banks, financial institutions, everyday citizens, decentralized organizations, decentralized autonomous organizations, law enforcement, internet service providers, social media platform operators, search engines, and other participants in system 400.

Figure 5:
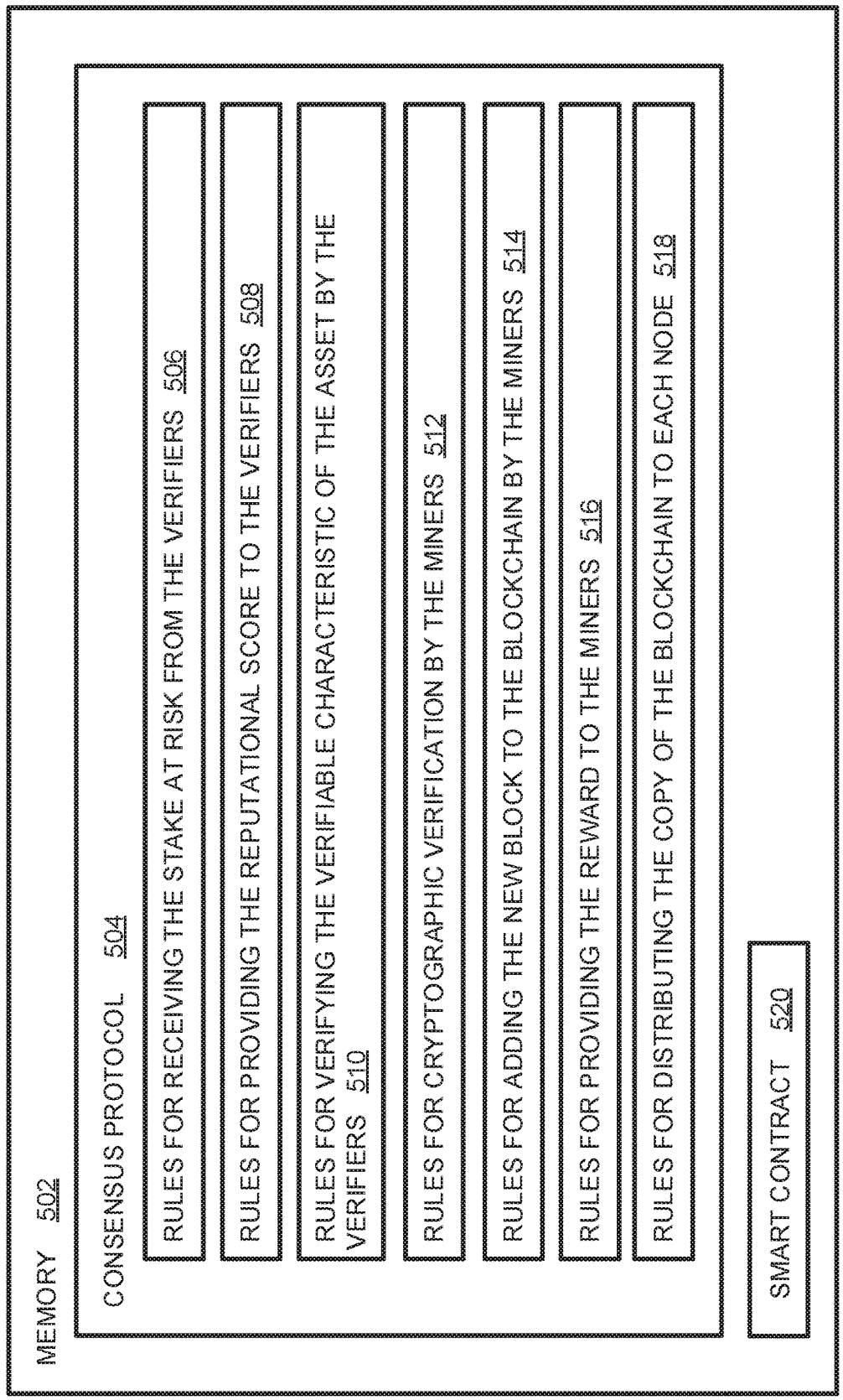
FIG. 5 is a diagram of a system for building blockchains for verifying assets for smart contracts, according to an example embodiment of the disclosure.

FIG. 5 is a diagram of a system 500 for building blockchains for verifying assets for smart contracts, according to an example embodiment of the disclosure. System 500 includes a consensus protocol 504. Consensus protocol 504 can be in memory 502 and include rules for: receiving the stake at risk from the verifiers 506, providing the reputational score to the verifiers 508, verifying the verifiable characteristic of the asset by the verifiers 510, cryptographic verification by the miners 512, adding the new block to the blockchain by the miners 514, providing the reward to the miners 516, and distributing the copy of the blockchain to each node 518. System 500 can further include a smart contract 520 for the asset in the blockchain, where the blockchain includes the new block that verifies the at least one verifiable characteristic of the asset.

System 500 can be a blockchain peer-to-peer network where nodes propagate information for blockchain replica synchronization. Nodes may have functionality for data communication, peer discovery, identity management, and topology maintenance. Nodes may have varying functionality as verifiers, miners or secure key issuers for issuing public and private keys. Nodes may be lightweight nodes, full nodes, or consensus nodes. Lightweight nodes such as wallets may issue transactions and have limited local storage and refer to other memory 502. Full nodes may store a complete replica of the blockchain in memory 502. Consensus nodes may enable the functionality of consensus participation with consensus protocol 504 and smart contract 520 in memory 502 and may publish new blocks on behalf of other nodes.

Consensus protocol 504 can be any set of rules for system 500 that organize how blockchains are built, assets are verified, and smart contracts 520 are used. Rules can impose threats to maintain order, offer rewards to incentivize good behavior, reward good actors, and punish bad actors, among other things. Rules can capture human input and reflect community values and norms. Rules can be automatically enforced through self-executing smart contracts 520. Rules can add flexibility in a decentralized network for system 500. Rules can be added, changed, or deleted according to rules in consensus protocol 504. One or more nodes in a network for system 500 can include memory 502 containing consensus protocol 504 and consensus protocol 504 may be provided to other nodes in the network. Consensus protocol 504 may include any type of consensus algorithms such as Proof-of-Work, Proof-of-Stake, Delegated Proof-of-Stake, Leased Proof-Of-Stake, Proof of Elapsed Time, Practical Byzantine Fault Tolerance, Simplified Byzantine Fault Tolerance, Delegated Byzantine Fault Tolerance, Directed Acyclic Graphs, Proof-of-Activity, Proof-of-Importance, Proof-of-Capacity, Proof-of-Burn, Proof-of-Weight or others.

Consensus protocol 504 can include rules for receiving the stake at risk from the verifiers 506. For example, a specific amount of coins stored in a wallet may be required for a node to be a verifier. For example, each verifier may need to submit collateral to a common pot such that some or all of the collateral may be lost under various conditions. For example, the portion of cryptocurrency in a verifier's wallet that are at stake may be locked. For example, a service or staking pool may stake coins on behalf of the verifier. For example, the amount of the stake at risk may depend on the role of the verifier in verifying the verifiable characteristic of the asset or the value of the asset, such as a gem expert who verifies the number of carats in a diamond ring or a retail brand expert who verifies the authenticity of a Louis Vuitton® bag. For example, a verifier may need to meet requirements for staking frequency or staking maturity.

Consensus protocol 504 can include rules for providing the reputational score to the verifiers 508. For example, decentralized reputation tracking can provide transparency into the origin and history of transactions that created the reputation. For example, participants in system 500 can evaluate the services of verifiers depending on the role of the verifier in verifying the verifiable characteristic of the asset such as a builder, a realtor, an inspector, a plumber, and a home owner each verifying the condition of plumbing in a residential home. For example, incentives in smart contract 520 may reward or punish a verifier based on verifying data or events in the real world or on the blockchain. For example, a verifier's real world credentials can be verified and contribute to a reputational score and added to the blockchain. For example, the reputational score can be a token and can be staked. For example, the reputational score can be part of the blockchain for certain types of transactions or participants.

Consensus protocol 504 can include rules for verifying the verifiable characteristic of the asset by the verifiers 510. For example, the rules can depend on the type of asset and the role of the verifier. For example, the lender of a mortgage may be required to verify the existence and terms of the mortgage for a commercial property. For example, a city inspector may be required to certify compliance with building permits and codes. For example, a property appraiser may be required to use three approaches for valuation: a sales comparison approach to value, a cost approach to value, and an income approach to value.

Consensus protocol 504 can include rules for cryptographic verification by the miners 512, for adding the new block to the blockchain by the miners 514, for providing the reward to the miners 516, and for distributing the copy of the blockchain to each node 518. Consensus protocol 504 can include incentive mechanisms, asymmetric encryption, homomorphic encryption, hash functions, Merkle Trees, cryptographic transport protocols, Proof of Stake, Byzantine Fault-Tolerant Replication Protocols, encrypted data transmission over peer-to-peer networks, data organization, consensus formation, and so on. The rules can create a process for miners to verify digital signatures in transactions in encrypted blocks, link new blocks with hash pointers into the blockchain, and replicate the blockchain to the nodes on the peer-to-peer network.

Smart contract 520 can include autonomously executable procedures so that system 500 can work as an autonomous organization system for managing data or transactions among the decentralized entities in the network. Smart contract 520 can enforce rules in consensus protocol 504. Smart contract 520 can receive the stake at risk from the verifiers and provide the reward to the miners. The stake at risk can be in cryptocurrency. The reward can be in cryptocurrency. The verifiers can pay a verification fee. The verifiers can receive a verification reward. The stake at risk can vary for different verifiers and the verification reward can vary depending on the stake at risk by the verifier.

Consensus protocol 504 can include rules for refreshing the at least one verifiable characteristic of the asset after an event or period of time.

Figure 6:
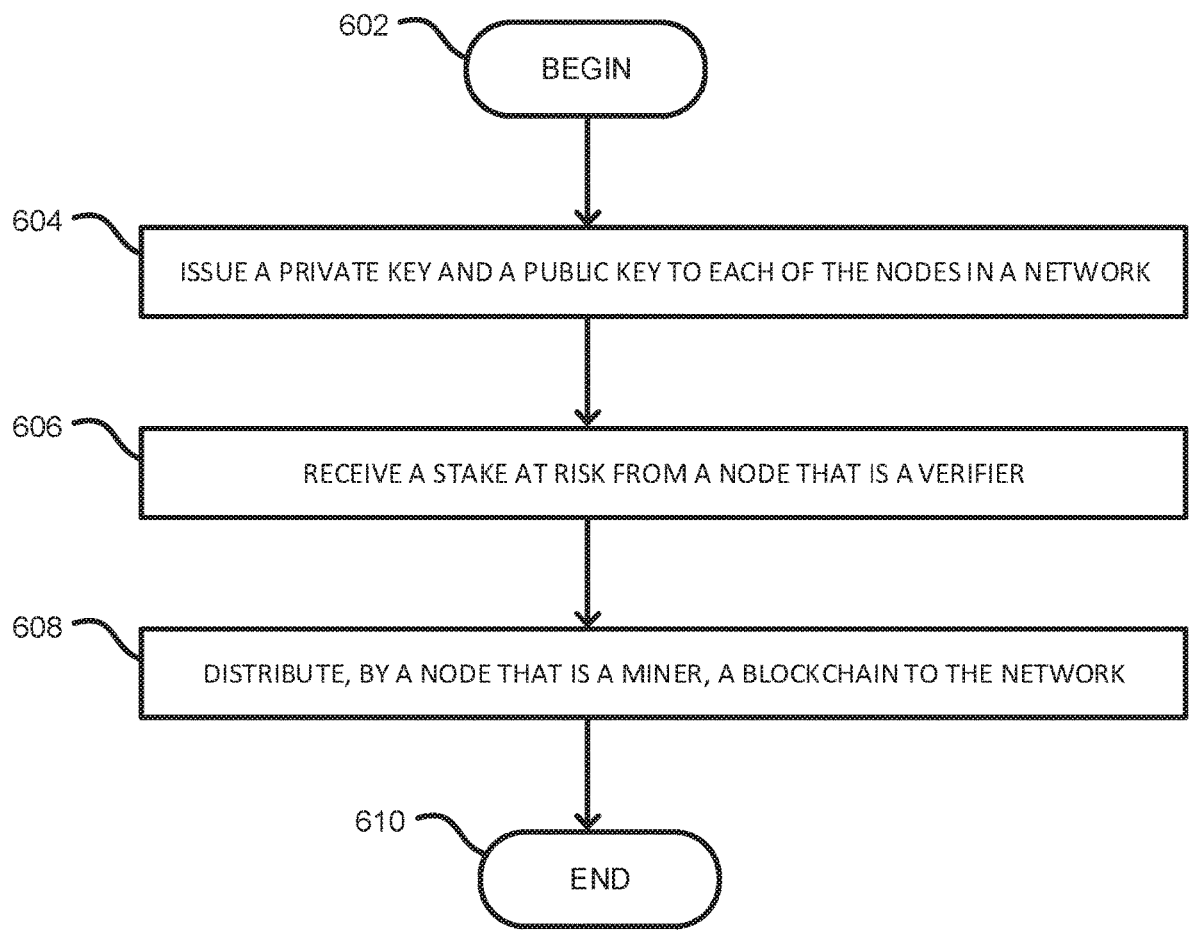
FIG. 6 is a flow chart of a method for building blockchains for verifying assets for smart contracts, according to an example embodiment of the disclosure.

FIG. 6 is a flow chart of a method 600 for building blockchains for verifying assets for smart contracts, according to an example embodiment of the disclosure. Method 600 begins at block 602.

At block 604, a private key and a public key can be issued to each of a set of nodes in a network. For example, when a node is added to a peer-to-peer network, one of the existing nodes can identify the new node and issue private and public keys to the new node, which the new node can store in memory. The private and public keys can be used to digitally sign blocks on the blockchain. For example, a verifier node can digitally sign a block with a private key and a miner node can verify the identity of digital signature as the verifier node using a public key.

At block 606, a stake at risk from a node that is a verifier can be received. For example, a consensus node can execute a smart contract to collect a collateral from the wallets of all the verifier nodes to be held in a common pot and used to pay out rewards for verifying a characteristic of an asset in a transaction on the blockchain.

At block 608, a node that is a miner can distribute a blockchain to the network. For example, a miner node can validate the transaction or data record that verifies the characteristic of the asset and add the transaction or data record to a new block on the blockchain using consensus and replication processes. For example, the asset can be a residential home with characteristics such as date built, square feet, address, liens, additions, mortgage, and provenance. These characteristics can be verified by multiple verifier nodes such as banks, government entities, local county lien authorities, neighbors and other stakeholders. Verifier nodes can encrypt and write information about the characteristics and their verification or confirmation to the new block. A miner node can add the new block to the blockchain and distribute it over the network using consensus processes. Method 600 ends at block 610.

In method 600, the blockchain can have a new block representing a transaction for an asset having an identifier and a verifiable characteristic. The verifiable characteristic can be verified and signed with a private key by the verifier and the new block can be cryptographically verified by the miner using a public key. A reward can be provided to the miner and a reputational score and/or verification fee or reward can be provided to the verifier. For example, a consensus rule and/or smart contract can set up incentives so that verifiers with greater knowledge of a particular kind of asset has a greater chance of validating a block and thus being rewarded with cryptocurrency. Using a proof of stake model, miners can be rewarded for verifying the cryptographic authenticity of the block. For example, when the asset on the blockchain is a house, a large bank or loan originator can be most likely to cryptographically verify the blocks written to the blockchain but other entities that participate can also earn the right to earn cryptocurrency. Once the blocks verifying the loan by the bank and other verifications are on the blockchain and immutable, the blockchain for the house can be used to enter into an Ethereum contract, for example, and be bought and sold. In this way, various characteristics of an asset can be cryptographically secured, proved and vouched for so that the digital representation on the blockchain is trustworthy.

In method 600, after the asset is verified and added to the blockchain, a smart contract can be provided for sale of the asset and/or the asset can be provided for sale in the real world. For example, once a retail brand expert verifies a Louis Vuitton® handbag in the blockchain, the handbag may be sold in an auction. Verified assets on the blockchain can create a trusted environment for digital sale without a buyer needing to examine the asset in person. Upon an event or expiration of a time period, verification of the asset on the blockchain can be requested, which may be a condition in the smart contract. For example, if the asset is a car, proof of title may be required before registration is issued or an emissions test may be required before a license plate is issued. For example, if an addition is added to a home, a basement is finished, or a kitchen remodeled, a building inspector may need to verify the home is still up to code. A later verification can influence reputational scores, for example, if an asset that was thought to be real was determined later to be fake.

Figure 7:
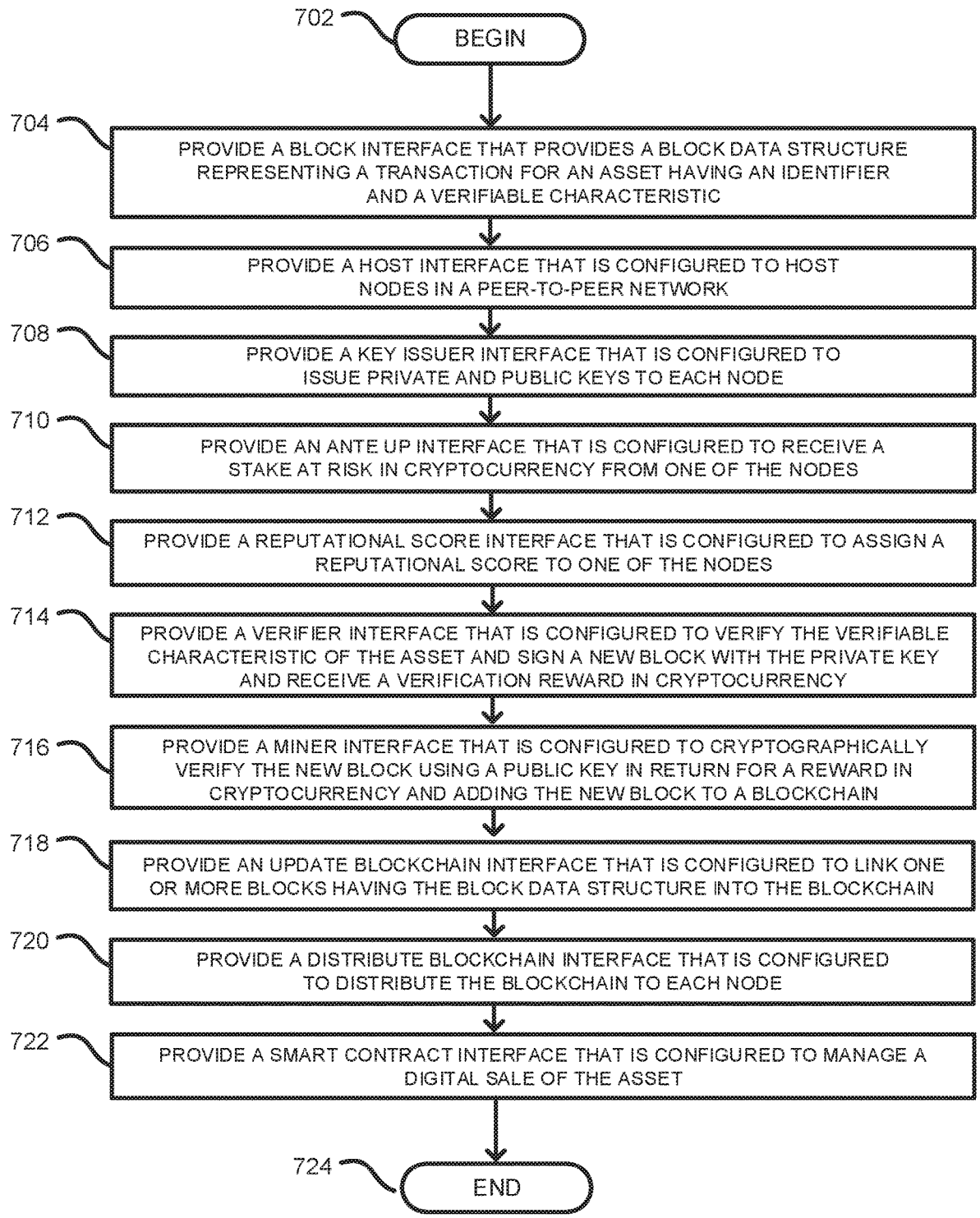
FIG. 7 is a flow chart of a method for building blockchains for verifying assets for smart contracts, according to an example embodiment of the disclosure.

FIG. 7 is a flow chart of a method 700 for building blockchains for verifying assets for smart contracts, according to an example embodiment of the disclosure. A non-transitory computer-accessible medium having stored thereon computer-executable instructions for building blockchains for verifying assets for smart contracts, wherein upon execution by a computer arrangement comprising a processor, the instructions cause the computer arrangement to perform method 700. For example, the non-transitory computer-accessible medium may be a memory or other storage device accessible by one or more nodes in a peer-to-peer network.

Method 700 beings at block 702. At block 704, a block interface can be provided that provides a block data structure representing a transaction for an asset having an identifier and at least one verifiable characteristic. The block interface and block data structure can be in memory on a node and readable by the other nodes. The transaction can be any kind of event related to verifying the asset, like adding a digital representation of the asset. For example a photo and description of a home can be added in a transaction, which is verifiable by a realtor. The home can be identified by the address or some other identifier. Blocks in the blockchain can be related to the same home by referencing the identifier in the block data structure and the history of transactions related to this home in the blockchain can be reviewed by nodes. The block data structure can be a structured template or sort of schema that is specific to the category of the asset. For example, a diamond ring may include cut, clarity, color, how it is mounted, and the like while a home may include square footage, lot size, previous ownership, address and the like. Various different block data structures can be available in memory on a node that are specific to different categories of assets. Various consensus processes can require certain kinds of verification for different kinds of assets, depending on industry customs or norms, regulation, marketplace participants, and the like.

At block 706, a host interface can be provided that can be configured to host a set of nodes in data communication in a peer-to-peer network. The host interface can be in memory on a node and readable by the other nodes. The host interface can include processes for consensus, node identity management, data communications, cryptography, and other processes. The host interface can be used by nodes to host a blockchain for verifying assets and smart contracts.

At block 708, a key issuer interface can be provided that can be configured to issue private and public keys to each of the nodes. The key issuer interface can be in memory on a node and readable by the other nodes. The key issuer interface can include processes for issuing private and public keys to nodes being added to the network and managing the keys over time.

At block 710, an ante up interface can be provided that can be configured to receive a stake at risk in cryptocurrency from one of the nodes. The ante up interface can be in memory on a node and readable by the other nodes. The ante up interface can collect stakes at risk by verifier nodes using Proof of Stake consensus protocols. The stakes at risk can be pooled into a common pot and used to pay out fees or rewards for verification. A node can provide cryptocurrency for the stake at risk from their wallet on the blockchain.

At block 712, a reputational score interface can be provided that can be configured to assign a reputational score to one of the nodes. The reputational score interface can be in memory on a node and readable by the other nodes. The reputational score can be assigned in various ways such as by other nodes based on verification, mining and following consensus processes. Verifiers who deviate from consensus can lose their stake. Consensus processes can be devised to provide incentives to cooperate and punishment for bad behavior such as financial rewards and costs. Consensus processes can pair verifiers having low and high reputations. For example, a seasoned verifier can be paired with a novice verifier so that both make the same verification and it is more trustworthy than the novice verifier alone.

At block 714, a verifier interface can be provided that can be configured to verify the verifiable characteristic of the asset and sign a new block with the private key and receive a verification reward in cryptocurrency. The verifier interface can be in memory on a node and readable by the other nodes. The number and kind of characteristics can depend on the type of asset. Many different verifiers can contribute to verifying different characteristics or aspects of the asset. For example, a verifier who is a builder can contribute the date a home was built and the square feet of the home. Another verifier who is a county inspector may verify that additions to the home are built to code. A verifier who is a photographer may verify the address of the home and the date of the photo. A verifier who is loan officer at a bank may verify the mortgage information. A verifier who is a neighbor may verify information about the neighborhood. Each verifier can post or contribute to the verification of the home in a transaction or block on the blockchain and encrypt the verification information using the private key. The verification information on the blockchain can be decrypted using a public key by other nodes. All of the verifiers can contribute to the overall representation of the home on the blockchain. Verifiers can engage in a proof of ownership model because they each have a vested interest in the accurate representation of the home and can check each other's information to verify that it came from an authoritative source, that it is accurate, etc. The verification reward can be paid out in cryptocurrency to verifier nodes using their wallets on the blockchain, according to consensus processes. Some verifiers can be paid verification fees according to smart contracts for special expertise or work, such as mortgage lenders, title recorders, or appraisers. The blockchain can be trusted for premium assets because of the verified characteristics and the reputations of the verifiers.

At block 716, a miner interface can be provided that can be configured to cryptographically verify the new block using a public key in return for a reward in cryptocurrency and add the new block to a blockchain. The miner interface can be in memory on a node and readable by the other nodes. Miners can verify the digital signatures of new blocks and add them to the blockchain according to proof of stake consensus processes.

At block 718, an update blockchain interface can be provided that can be configured to link one or more blocks having the block data structure into the blockchain. The update blockchain interface can be in memory on a node and readable by the other nodes. A miner node can link a new block to the blockchain, according to consensus processes.

At block 720, a distribute blockchain interface can be provided that can be configured to distribute the blockchain to each node. The distribute blockchain interface can be in memory on a node and readable by the other nodes. A consensus node can distribute the updated blockchain to all the nodes, according to consensus processes.

At block 722, a smart contract interface can be provided that can be configured to manage a digital sale of the asset. The smart contract interface can be in memory on a node and readable by the other nodes. Method 700 ends at block 724. For example, a blockchain for a Louis Vuitton® handbag that verifies that the handbag is real and not fake can be used in the smart contract for a digital sale of the handbag. For example, a blockchain for a home with many trust-building, property-related verifications can be used by a real estate agent in the smart contract for a digital sale of the home. For example, third party resellers on Amazon® can use a blockchain to prove goods are not counterfeit by having a chain of ownership and/or various verifications.

In this description, numerous specific details have been set forth. It is to be understood, however, that implementations of the disclosed technology can be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described can include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it could.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
   a memory for storing a plurality of data blocks each corresponding to a digital representation of a distinct verifiable characteristic associated with a real world asset, and an asset identifier, identifying the real world asset, wherein one or more data blocks with a common asset identifier represent the real world asset with one or more verifiable characteristics;
   one or more verification nodes, each having a distinct tokenized reputational score and configured to:
      verify an asset characteristic for a transaction in an old blockchain block of a blockchain based on an asset identifier;
      attest to an authenticity of the asset characteristic, the attestation comprising:
         digitally signing, based on the verification of the asset characteristic, a new blockchain block with a private key thereby encrypting the new blockchain block; and
         offering the new blockchain block for addition to the blockchain;
      stake a token corresponding to the tokenized reputational score against an accuracy of the new blockchain block added to the blockchain, and
      receive an updated tokenized reputational score based on the staked token corresponding to the tokenized reputational score and a determined accuracy of the new blockchain block;
   one or more mining nodes, each configured to:
      confirm a digital signature of one of the verification nodes on the new blockchain block, the confirmation comprising decrypting the new blockchain block by applying a public key;
      verify the asset characteristic within the new blockchain block; and
      receive a reward for confirming the digital signature and verifying the asset characteristic within the new blockchain block;
   the one or more mining nodes being configured to add the confirmed and verified new blockchain block to the blockchain from the memory;
   a secure key issuer node for issuing a public key and a private key for each of the one or more verification nodes; and
   a smart contract to facilitate a digital sale of the real world asset, represented as one or more validated encrypted data blocks, on the blockchain.

2. The system of claim 1, wherein the one or more validated encrypted data blocks are tied together based on the common asset identifier.

3. The system of claim 1, wherein a verification node receives a verification reward for verifying an asset characteristic by signing a corresponding data block with a private key associated to it.

4. The system of claim 3, wherein the verification reward varies depending on the verification node.

5. The system of claim 3, further comprising:
   a second smart contract for providing the verification reward.

6. The system of claim 1, wherein the common asset identifier uniquely identifies the real world asset.

7. The system of claim 1, wherein one of the one or more verification nodes with a high reputational score relative to other verification nodes is paired with a novice verifier to improve the trustworthiness of the novice verifier.

8. A method of providing a blockchain representation of a real world asset, the method comprising:
   specifying a real world asset, corresponding to an item of value, in terms of an asset identifier and a plurality of asset characteristics associated with the item of value;
   digitally representing each of the plurality of asset characteristics, associated with the real world asset, as a corresponding block data structure referencing the asset identifier of the real world asset;
   verifying, by a verification node, at least one of the plurality of asset characteristics for a transaction in an old blockchain block of a blockchain based on the asset identifier;
   attesting, by the verification node, to an authenticity of the at least one of the plurality of asset characteristics, the attestation comprising:
      digitally signing, based on the verification of the at least one of the plurality of asset characteristics, a new blockchain block with a private key thereby encrypting the new blockchain block; and
      offering the new blockchain block for addition to the blockchain;
   staking, by the verification node, a verification node token corresponding to a tokenized reputational score against an accuracy of the new blockchain block added to the blockchain;

receiving an updated tokenized reputational score based on the staked verification node token corresponding to the tokenized reputational score and a determined accuracy of the new blockchain block;

confirming, by a mining node, a digital signature of one of the verification node on the new blockchain block, the confirmation comprising decrypting the new blockchain block by applying a public key;

verifying, by the mining node, the at least one of the asset characteristics within the new blockchain block; and receiving, by the mining node, a reward for confirming the digital signature and verifying the at least one of the asset characteristics within the new blockchain block;

adding the confirmed and verified new blockchain block to the blockchain from storage in a memory;

providing the blockchain representation of the real world asset, as one or more authenticated encrypted data blocks, to facilitate a digital sale of the real world asset.

9. The method of claim 8, further comprising:
providing a verification reward to each of a plurality of verification nodes for cryptographically verifying an asset characteristic.

10. The method of claim 8, further comprising:
providing a smart contract for the digital sale of the blockchain representation of the real world asset.

11. The method of claim 8, further comprising:
providing an interface that enables the digital sale of the real world asset represented on the blockchain.

12. The method of claim 8, further comprising an event based asset characteristic verification comprising private key signing of a corresponding data block.

13. The method of claim 8, wherein the asset identifier uniquely identifies the real world asset.

14. The method claim 9, wherein the verification reward varies depending on a verification node.

15. The method of claim 9, wherein the verification reward is provided using a smart contract.

* * * * *